United States Patent

[11] 3,591,808

| [72] | Inventors | Rudolf Prag<br>Marloffstein;<br>Edgar Tschunt, Erlangen, both of,<br>Germany |
|---|---|---|
| [21] | Appl. No. | 786,583 |
| [22] | Filed | Dec. 24, 1968 |
| [45] | Patented | July 6, 1971 |
| [73] | Assignee | Siemens Aktiengesellschaft<br>Erlangen, Germany |
| [32] | Priority | Jan. 5, 1968 |
| [33] | | Germany |
| [31] | | P 16 16 111.8 |

[54] DEVICE FOR DIAGNOSIS WITH RADIOACTIVE ISOTOPES
2 Claims, 3 Drawing Figs.

[52] U.S. Cl. .................................................. 250/71.5,
250/105, 350/252, 350/257
[51] Int. Cl. ............................................. G01t 1/20
[50] Field of Search .......................................... 250/71.5 S,
71.5, 105; 350/252, 257

[56] References Cited
UNITED STATES PATENTS
| 2,942,109 | 6/1960 | Bell et al. ..................... | 250/105 |
| 2,999,935 | 9/1961 | Foster ........................... | 250/105 |
| 3,049,970 | 8/1962 | Steinberg ..................... | 350/257 |

*Primary Examiner*—Walter Stolwein
*Assistant Examiner*—Morton J. Frome
*Attorney*—Richards and Geier ABSTRACT: An apparatus for isotope diagnosis has a measuring device for determining the distribution of radioactive substances in a body from rays emitted by these substances. The device includes an element sensitive to these rays and located in a housing made of a material which does not transmit the rays. The ray-sensitive element has a surface receiving the rays and covered by a collimator which can be pushed into the housing. One collimator may be exchanged for other collimators of different lengths, the length of the housing being at least equal to that of the longest collimator plus the length of the ray-sensitive element. The invention is particularly characterized in that the ray-sensitive element is also movable in the direction of the longitudinal axis of the housing. The ray-sensitive element and the collimator are joined and the surface of the collimator which receives the incoming rays is located in an opening of the screening housing.

PATENTED JUL 6 1971 3,591,808

INVENTORS.
R. Präg and E. Tschunt
BY
Richards & Geier
ATTORNEYS

DEVICE FOR DIAGNOSIS WITH RADIOACTIVE ISOTOPES

This invention relates to an apparatus for isotope diagnosis or scanner having a measuring device for determining the distribution of radioactive substances in a body from rays emitted by these substances. The device includes a ray-sensitive element in a housing made of a substance impermeable to these rays. The surface of the ray-sensitive element receiving the rays is covered by a collimator which can be pushed into the housing. One collimator can be replaced by other collimators of different lengths. The length of the housing corresponds at least to that of the longest collimator plus that of the ray-sensitive element.

Devices of this type are mostly used for examining a human body to find sick locations to which radioactive substances are supplied. They can be also used for examining circulation in that radioactive substances may be introduced into the bloodstream and their appearance and concentration can be determined at one or several other locations.

Prior art measuring device of ray diagnosis apparatus includes a ray-sensitive element, such as a scintillation counter, a Geiger-Müller counter or the like, located in a housing of ray-impermeable material, and a collimator. This collimator includes a plurality of narrow channels separated from each other by an absorbing material and directed to the source of light. For example, the collimator may consist of a bundle of tubes consisting of a screening substance. Since the sources of rays which are being examined are located in a body and consist of radiators of different types, it is necessary to use collimators of different lengths. On the other hand, there is a basic requirement of the ray diagnosis apparatus that the collimator should be close to the ray-sensitive element. Thus when using collimators of different lengths, either a construction is necessary the length of which changes depending upon that of the collimator being used, or one wherein the screening housing is so long that even the longest collimator can be pushed into it. In the prior art devices the sensitive element is located close to one end of the housing, so that collimators which are shorter than the longest collimator being used must be pushed into the housing. In that case, however, it is not always possible to make the distance between the collimator and the object being examined as small as may be desired. When short collimators are used, a piece of the housing stands in the way and prevents the bringing of the body being examined completely closely to the collimator.

An object of the present invention is to eliminate these difficulties.

Other objects will become apparent in the course of the following specification.

In the accomplishment of the objectives of the present invention it was found advisable to make the ray-sensitive element movable along the longitudinal axis of the housing, the ray-sensitive element and the collimator being joined and the surface of the collimator which receives the incoming rays being located in an opening of the screening casing.

This construction of the present invention always provides a good closeness of the ray-receiving surface of the sensitive element to the collimator. At the same time the ray-receiving surface of the collimator is located at the entry opening of the measuring device. Then the length of the collimator is of no importance, since, irrespective of its length, the best possible location of the ray-sensitive element is always present.

According to an embodiment of the present invention the collimator and the sensitive element have the same diameter. Then the screening casing can have the same uniform inner diameter, so that the sensitive element and the collimator can be moved throughout the entire length of the casing.

Means can be provided which produce a force opposed to the insertion of the collimator to provide automatically a good closeness of the sensitive element to the collimator. Springs can be used to produce this counterforce. When the measuring device is used only in an at least substantially vertical position in which the ray-sensitive element is located above the collimator, pressure by the weight of the sensitive element can be sufficient, so that then the use of additional means is not necessary. To prevent the collimators from being pushed out of the measuring device by the counterforce effective in the housing, holding means are used, such as a rotary lever or the like, which is turned after the insertion of the collimator so as to engage the end surface of the collimator and thus prevent it from falling out.

The invention will appear more clearly from the following detailed description when taken in connection with the accompanying drawing, showing by way of example only, preferred embodiments of the inventive idea.

Figure 1:
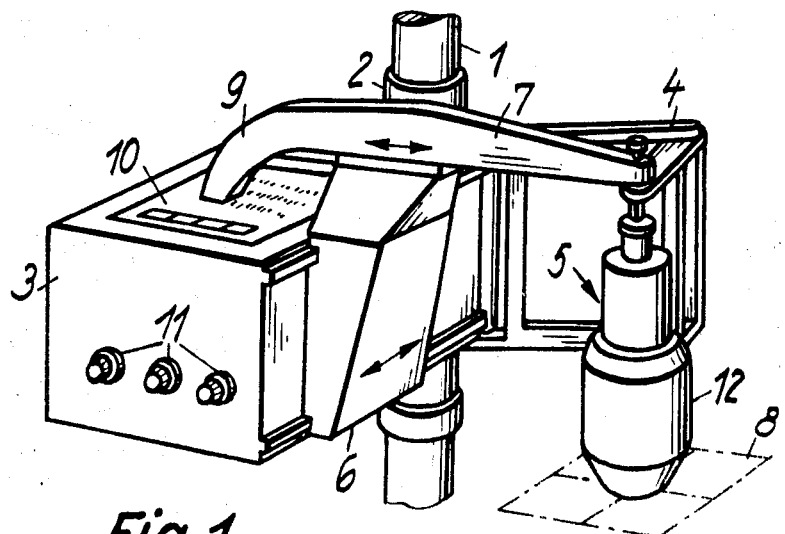
FIG. 1 is a perspective view of a portion of a scanner showing a measuring device provided with an exchangeable collimator.

FIG. 1 shows a box 3 serving as a container and carrier for the apparatus. The box 3 is vertically adjustable in a manner which is not further illustrated, by means of a sleeve 2 upon a pillar 1. A double joint fork 4 is connected to the box 3 and carries the measuring device 5 containing a ray indicator which is properly protected against ray action. The box 3 contains a drive by means of which the measuring device 5 is moved through a bogie 6 and a guide 7 over a measuring surface 8 while carrying out line by line testing. A writing head 9 is correspondingly mounted upon the other end of the guide 7 and is guided over a recording sheet 10 exchangeably fixed upon an upper surface of the box 3. Operating buttons 11 are used to operate adjusting devices now shown in the drawing and used for adjusting mechanical values, such as the testing speed, the height of line shifting and the size of the recording, etc., as well as for adjusting electrical values, such as sensitivity, extent of reduction etc.

Figures 2, 3:
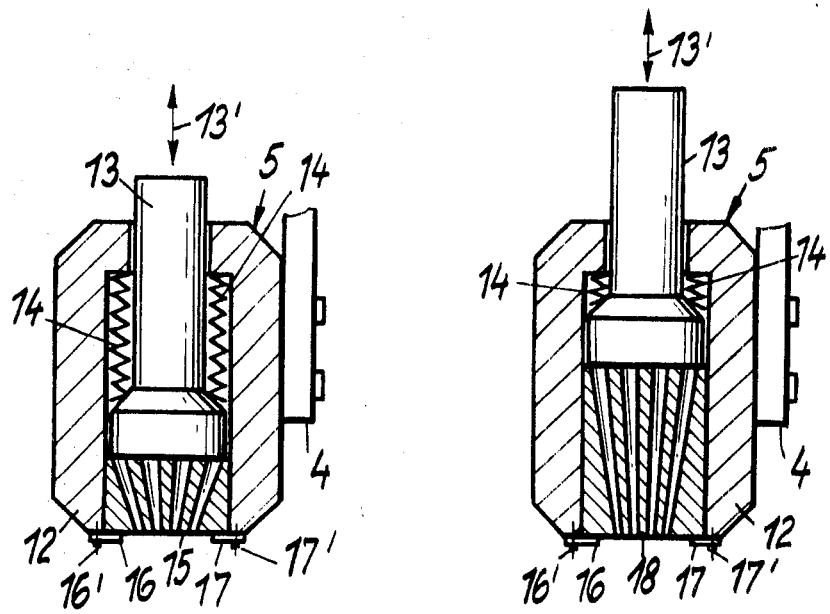
FIG. 2 is a section through a measuring device containing a short collimator.
FIG. 3 is a section through a measuring device the ray-receiving surface of which is provided with a long collimator.

FIG. 2 shows the screening housing 12 of the measuring device 5 and the ray-sensitive element 13 longitudinally movable with the housing 12, as indicated by double arrows 13'. The element 13 is pressed by pressure springs 14 against a collimator 15 inserted into the opening of the housing 12. The collimator is secured from falling out by levers 16 and 17, which are swingable about the axes 16' and 17', respectively.

FIG. 3 shows a long collimator 18 which is inserted into the ray-inlet opening of the screening housing 12, whereby the springs 14 are more strongly compressed. The collimator 18 is also secured by levers 16 and 17, which are swingable about the axes 16' and 17', respectively.

The advantage of the device of the present invention is that the cross section of the housing 12 is always completely effective from the side, irrespective as to whether a short collimator 15 (FIG. 2) is used, or the collimator 18 (FIG. 3) having a long extension in depth.

We claim:

1. A measuring device for an isotope diagnosis apparatus, said device comprising a collimator, a housing impermeable to radioactive rays and having an inner space containing said collimator and an opening communicating with said space and receiving the radioactive rays, the size of said space being adequate to receive collimators of different lengths, said collimator being inserted into said space through said opening and having a ray-receiving surfacing located in said opening, a ray-sensitive element located in said space and engaging said collimator, and springs pressing said ray-sensitive element against said collimator in a direction toward said opening, whereby both said collimator and said ray-sensitive element are movable within said housing in the direction of the longitudinal axis of said housing.

2. A device in accordance with claim 1, comprising at least one lever swingably mounted upon said housing adjacent said opening and adapted to engage said collimator to prevent it from falling out through said opening.